US007351896B2

(12) United States Patent
Clifford

(10) Patent No.: US 7,351,896 B2
(45) Date of Patent: Apr. 1, 2008

(54) CLAMP FOR MUSICAL INSTRUMENT

(76) Inventor: Charles Clifford, 2516 St Anthony Blvd., St Anthony, MN (US) 55418

( * ) Notice: Subject to any disclaimer, the term of this patent is extended or adjusted under 35 U.S.C. 154(b) by 0 days.

(21) Appl. No.: 11/566,336

(22) Filed: Dec. 4, 2006

(65) Prior Publication Data

US 2007/0125222 A1 Jun. 7, 2007

Related U.S. Application Data

(60) Provisional application No. 60/742,163, filed on Dec. 5, 2005.

(51) Int. Cl.
*G01D 3/00* (2006.01)

(52) U.S. Cl. .......................................................... 84/327

(58) Field of Classification Search .................. 84/327, 84/329, 421, 290
See application file for complete search history.

(56) References Cited

U.S. PATENT DOCUMENTS

| | | | | |
|---|---|---|---|---|
| 4,078,753 A | | 3/1978 | Cole | |
| 4,084,778 A | | 4/1978 | Dominguez | |
| 4,176,580 A | | 12/1979 | Gallegos | |
| 4,205,818 A | | 6/1980 | Lawler | |
| 4,991,809 A | | 2/1991 | Harkey | |
| D337,345 S | | 7/1993 | Gracie | |
| D339,484 S | * | 9/1993 | Greene et al. | D6/453 |
| 5,313,866 A | | 5/1994 | Smith | |
| 5,346,168 A | | 9/1994 | Astrella | |
| D355,773 S | | 2/1995 | MacOwan | |
| 5,645,256 A | | 7/1997 | Thomas, II | |
| 6,209,829 B1 | | 4/2001 | Yu | |
| 6,323,405 B1 | | 11/2001 | Yu | |
| 6,439,532 B1 | | 8/2002 | Yu | |
| 6,484,977 B1 | | 11/2002 | Yu | |
| 6,559,365 B2 | | 5/2003 | Wilfer | |
| 6,685,145 B2 | | 2/2004 | Mackay et al. | |
| 7,151,213 B2 | * | 12/2006 | Hsieh | 84/453 |

* cited by examiner

*Primary Examiner*—Kimberly Lockett
(74) *Attorney, Agent, or Firm*—QuickPatents, Inc.; Kevin Prince

(57) ABSTRACT

A system is disclosed for holding a musical instrument, such as a guitar, to a vertical post, such as a lamp post. An upper clamp is adapted for clamping to the vertical post and includes an instrument neck holder for engaging an upper portion of the musical instrument. A lower clamp is adapted for clamping to the vertical post and includes an instrument base holder for engaging a lower portion of the musical instrument. Each clamp preferably includes two arcuate jaws each terminating at one end at an actuator portion pivotally fixed to a pivot rod. A coil spring surrounds the pivot rod and biases the jaws towards each other, such that when the actuators are squeezed toward each other the jaws are forced to pivot away from each other against the urging of the coil spring. Each clamp may be adjusted vertically on the post so as to allow musical instruments of varying sizes to be used with the system. The instrument neck and base holders each conform to the shape of a part of the musical instrument and are preferably padded.

7 Claims, 4 Drawing Sheets

Fig. 1
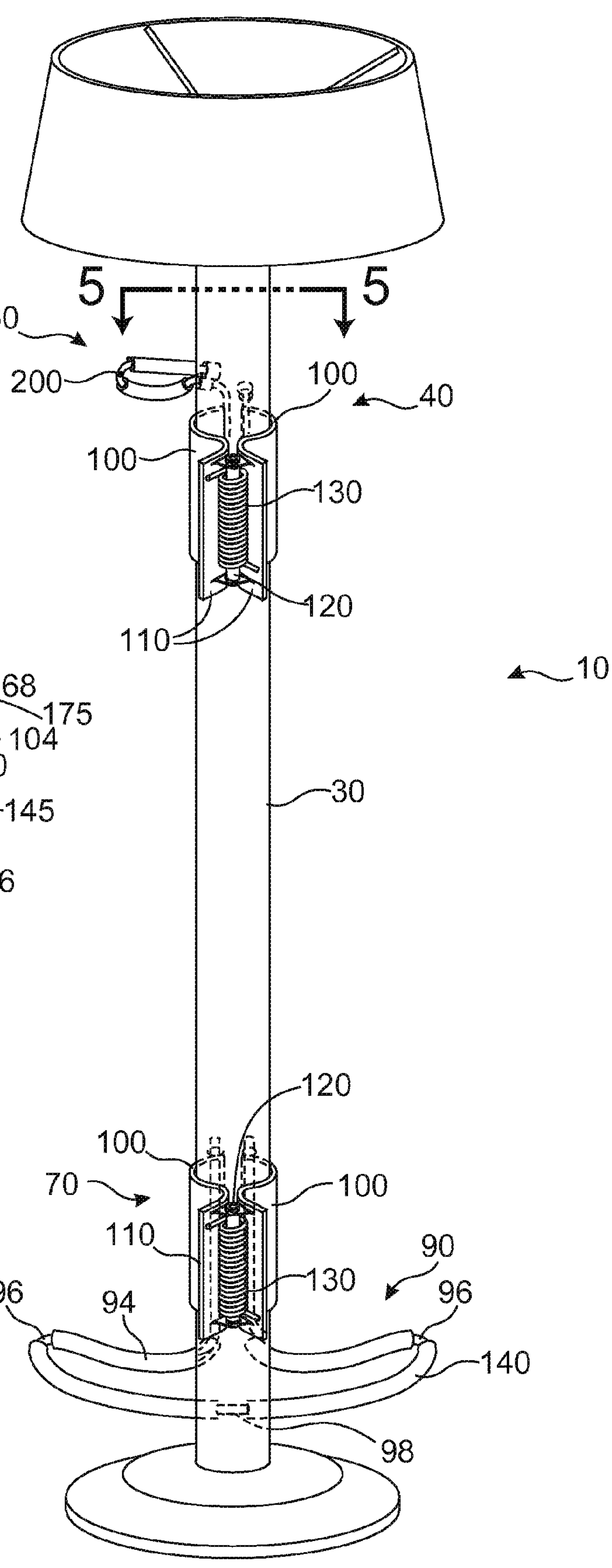
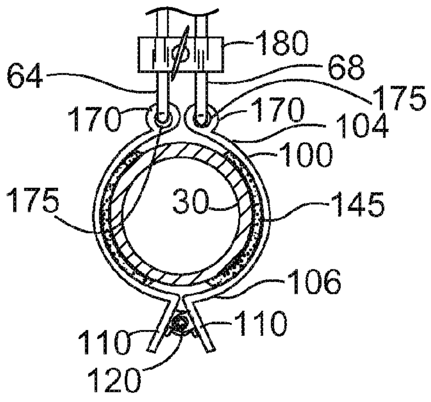
Fig. 5

CLAMP FOR MUSICAL INSTRUMENT

CROSS-REFERENCE TO RELATED APPLICATIONS

This application claims the benefit of U.S. Provisional Patent Application 60/742,163 filed on Dec. 5, 2005.

STATEMENT REGARDING FEDERALLY SPONSORED RESEARCH AND DEVELOPMENT

Not Applicable.

FIELD OF THE INVENTION

This invention relates to clamps, and more particularly to a musical instrument clamp for a lamp or other vertical post.

DISCUSSION OF RELATED ART

The prior art is replete with all types of guitar stands. Several typical guitar stands are found, for example, in the following US patents:

| Patent No. | Inventor | Issue Date |
|---|---|---|
| 6,685,145 | Mackay et al. | Feb. 3, 2004 |
| 6,559,365 | Wilfer | May 6, 2003 |
| 6,323,405 | Yu | Nov. 27, 2001 |
| 6,439,532 | Yu | Aug. 27, 2002 |
| 6,484,977 | Yu | Nov. 26, 2002 |
| 6,209,829 | Yu | Apr. 3, 2001 |

Such guitar stands are free-standing, often collapsible or portable, and often have a relatively wide footprint—that is, such stands often consume considerable floor space. On stage floor space is often either not severely limited or acceptable for use for guitar stands. However, when storing guitars in a residential environment, often floor space is limited, and a dedicated free-standing guitar stand is not practical. Yet, in such a home environment, it is often desirable to display one's guitars or other musical instruments. Consequently, there is a need for a display rack for a guitar that is both compact yet evident in a residential environment.

Several guitar support stands of the prior art are combined with diverse articles in an effort to conserve space. For example, U.S. Pat. No. 4,991,809 to Harkey on Feb. 12, 1991; U.S. Pat. No. 5,313,866 to Smith on May 24, 1994; U.S. Pat. No. 5,346,168 to Astrella on Sep. 13, 1994; and U.S. Pat. No. 4,084,778 to Dominguez on Apr. 18, 1978; all teach guitar stands integrated or otherwise attached to a box-like object, typically a guitar amplifier or other performing equipment. As with conventional guitar stands, while this may be suitable for use in a musical or stage environment, such amplifiers and box-like objects are typically not stored in a residential environment, for much the same reasons that guitar stands are not. Similar drawbacks exist with U.S. D No. 355,773 to MacOwan on Feb. 28, 1995 and U.S. Pat. No. 4,205,818 to Lawler on Jun. 3, 1980. Such devices combine a guitar rack with another object, such as a performing stool or a music stand. Yet these objects are not typically found in a home environment. Another drawback with the aforementioned prior art is that such dedicated stands or combinations are relatively expensive.

Other guitar stands or brackets are disclosed in U.S. D No. 337,345 to Gracie on Jul. 13, 1993; U.S. Pat. No. 4,176,580 to Gallegos on Dec. 4, 1979; U.S. Pat. No. 5,645,256 to Thomas, II on Jul. 8, 1997; and U.S. Pat. No. 4,078,753 to Cole on Mar. 14, 1978. Such devices hold a guitar by suspending the guitar from its neck portion from an object. These types of hanging brackets have several drawbacks. Although they tend to be less expensive than full-sized guitar racks, many people do not want to suspend the entire weight of the guitar on just the neck portion of the guitar for fear of damaging the guitar or severely affecting its tune. Further, such devices must typically be mounted on a flat surface, such as with conventional screws or hooks. As such, while wall space may be available for storing guitars in a residence, often it is not desirable to do so since guitars stored in such a way are not conveniently reached from, say, a couch or chair. Further, many people do not wish to damage walls by mounting such brackets.

Supporting a guitar on a lamp stand by resting the neck of the guitar against the stand with the body of the guitar on the ground is convenient and takes little space. However, such an arrangement is not stable, with the neck of the guitar easily sliding off of the lamp stand. Few people store guitars in this manner for fear of damaging their guitar. Further, the guitar must be leaned against the lamp stand at an angle so that the guitar doesn't fall forward inadvertently, which uses considerable floor space.

Therefore, there is a need for an inexpensive guitar mounting means suitable for supporting a guitar on a vertical post, such as a lamp stand. Such a needed device would hold a guitar close to the vertical post so as to keep the lamp stable. Such a device would be adjustable for a wide number of guitars or other musical instruments, and would consume little or no floor space beyond that used by the lamp. Further, such a needed invention would result in a guitar stored in such a device amply illuminated naturally by the lamp, making a practical yet aesthetically pleasing and convenient guitar display stand. The present invention accomplishes these objectives.

SUMMARY OF THE INVENTION

The present device is a system for holding a musical instrument, such as a guitar, to a vertical post, such as a lamp post. An upper clamp is adapted for clamping to the vertical post and includes an instrument neck holder for engaging an upper portion of the musical instrument. A lower clamp is adapted for clamping to the vertical post and includes an instrument base holder for engaging a lower portion of the musical instrument.

Each clamp preferably includes two arcuate jaws each terminating at one end at an actuator portion pivotally fixed to a pivot rod. A coil spring surrounds the pivot rod and biases the jaws towards each other, such that when the actuators are squeezed toward each other the jaws are forced to pivot away from each other against the urging of the coil spring. Each clamp may be adjusted vertically on the post so as to allow musical instruments of varying sizes to be used with the system. The instrument neck and base holders each conform to the shape of a part of the musical instrument and are preferably padded.

The present invention is an inexpensive guitar mounting system suitable for supporting a guitar on a vertical post, such as a lamp stand. The present device holds a guitar close to the vertical post so as to keep the lamp stable, and is adjustable for a wide variety of guitars or other musical instruments. Little or no floor space beyond that used by the lamp is required by the present invention, which results in a guitar stored in such a device being amply illuminated by the lamp. As such, the present device is a practical yet aesthetically pleasing and convenient guitar display stand. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1 is a perspective view generally from the rear of a system for holding a musical instrument to a vertical post, illustrating spring clamps of the invention;

FIG. 5 is a partial cross-sectional view of the invention, taken generally along lines 5-5 of FIG. 1, and illustrating a clamp of the invention.

DETAILED DESCRIPTION OF THE PREFERRED EMBODIMENT

Figure 2:
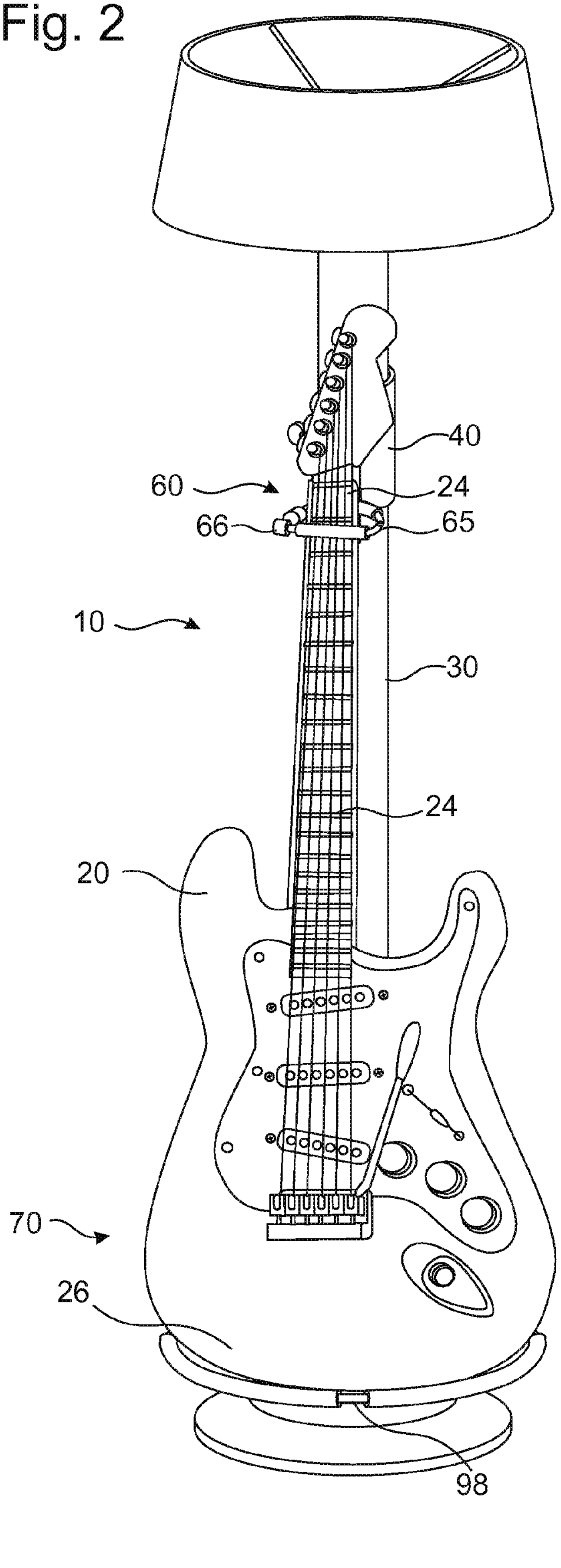
FIG. 2 is a perspective view generally from the front of the invention, illustrating the musical instrument as being held thereby on a lamp.

FIGS. 1 through 4 illustrate a system 10 for holding a musical instrument 20, such as a guitar, to a vertical post 30, such as a lamp post. An upper clamp 40 is adapted for clamping to the vertical post 30 and includes an instrument neck holder 60 for engaging an upper portion 24 of the musical instrument 20. A lower clamp 70 is adapted for clamping to the vertical post 30 and includes an instrument base holder 90 for engaging a lower portion 26 of the musical instrument 20.

Each clamp 40,70 preferably includes two arcuate jaws 100 each terminating at one end 106 at an actuator portion 110 pivotally fixed to a pivot rod 120. A coil spring 130 surrounds the pivot rod 120 and biases the jaws 100 towards each other, such that when the actuators 110 are squeezed toward each other the jaws 110 are forced to pivot away from each other against the urging of the coil spring 130. The jaws 100 are adapted to clamp to the vertical post, the post being generally cylindrical. A cushioning material 145 fixed to an inside surface of each arcuate jaw 100 for preventing direct contact between the jaws 100 of each clamp 40,70 and the vertical post 30.

Figure 3:
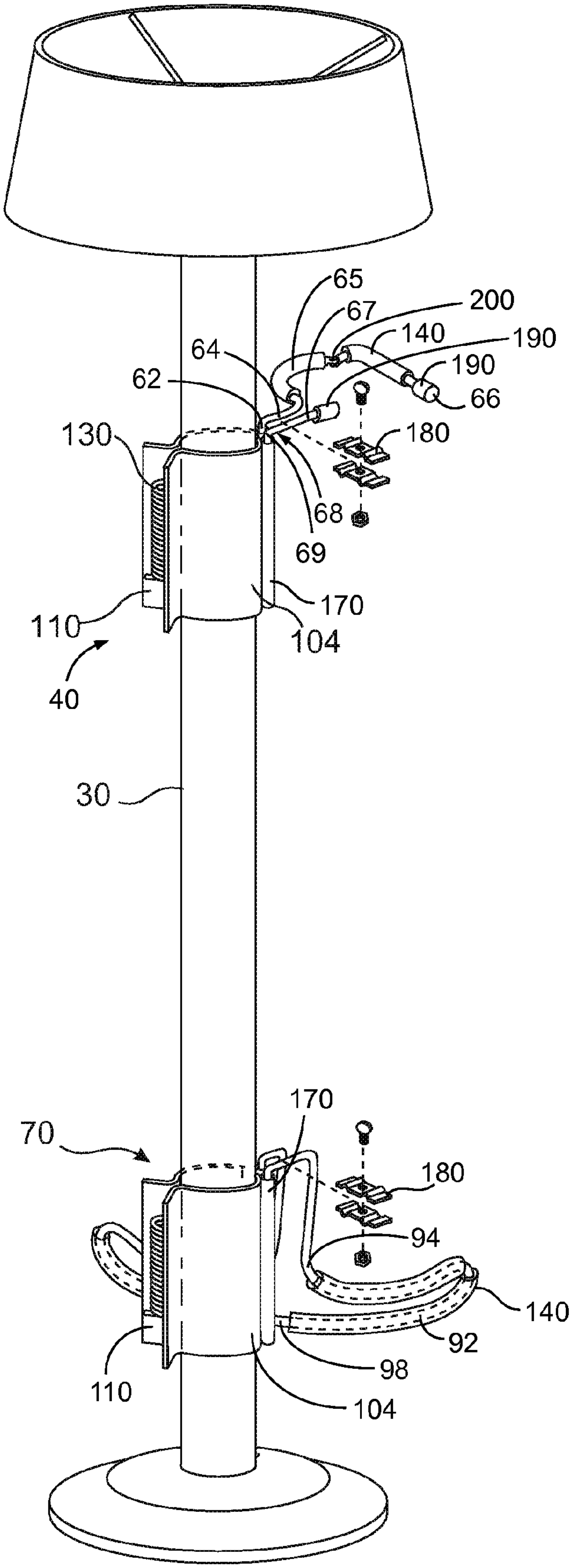
FIG. 3 is a perspective partially-exploded view of the invention.

The instrument neck holder 60 is preferably a horizontal substantially C-shaped rod 65 terminating at one end 64 thereof at a vertical post 62 (FIG. 3). The instrument neck holder 60 may further include a substantially L-shaped rod 67 having a horizontal post 68 and a vertical post 69. Another end 104 of each jaw 100 of each clamp 40,70 terminates at a holder attachment means 170, such as a generally hollow cylindrical tube 175 open at both ends thereof (FIG. 5). The tube 175 receives the vertical post 62,69 of the C-shaped rod 65 and the L-shaped rod 67, respectively. Further, a locking clip 180 may be included to selectively lock the L-shaped rod 67 and the C-shaped rod 65 together, thereby further enhancing the clamping force of the upper clamp 40 (FIG. 3).

Both the C-shaped rod 65 and the L-shaped rod 67 may include at least one padded stop 190 for holding the upper portion 24 of the instrument 20 within a C-shaped portion of the C-shaped rod 65. The C-shaped rod 65 may further include a spring-biased hinge 200 at a central portion thereof for urging a second end 66 of the C-shaped rod towards the vertical post 62 thereof (FIG. 3). Each rod 65,67 may additionally include a cushioning material 140 therearound to prevent direct contact of the rigid rods 65,67 with the musical instrument 20, thereby preventing the clamp 40 from damaging the musical instrument 20 through forceful contact therewith.

Figure 4:
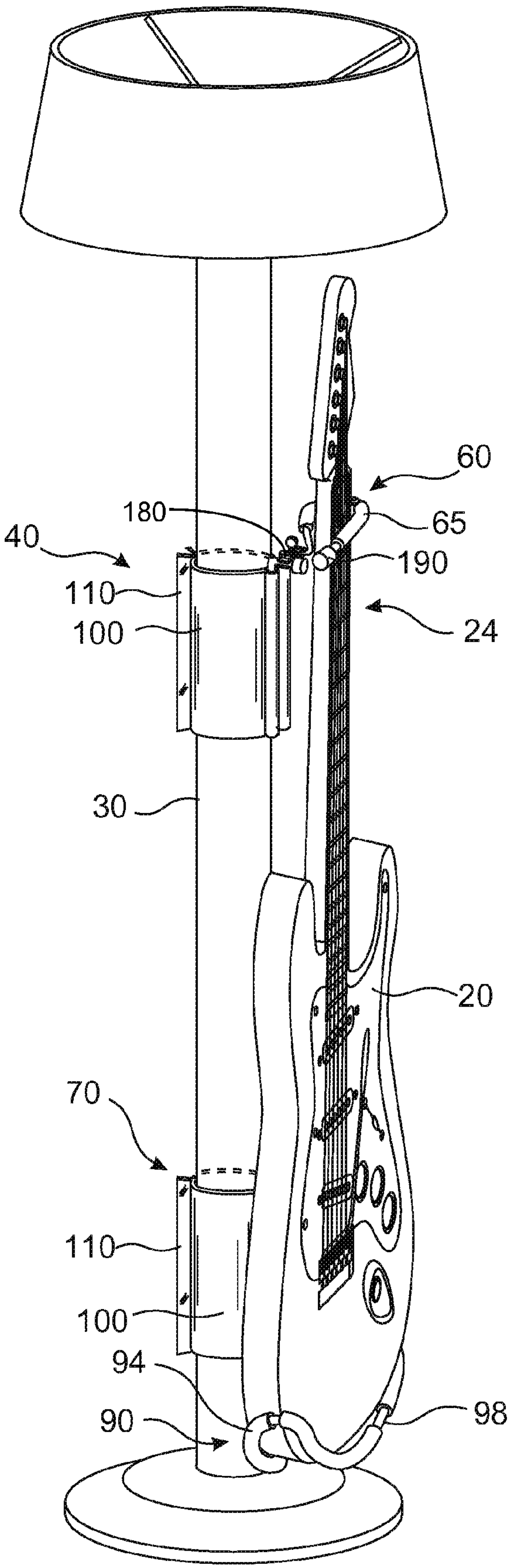
FIG. 4 is a perspective view generally from the side of the invention, illustrating the invention as supporting the musical instrument.

The instrument base holder 70 may be a substantially J-shaped rod 94, but is preferably a pair of J-shaped rods 94 each joined at a short end 96 thereof by a lateral cross-rod 98 (FIGS. 1 and 4). An upper end 95 of each J-shaped rod 94 is inserted into the tube 175 of each jaw 100 of the clamp 70, as illustrated best in FIG. 3, and one of the clips 180 is fastened thereto to further secure the clamp 70 onto the post 30. Such an instrument base holder 70 may also be covered in the cushioning material 140 so that the musical instrument 20 is not damaged by forceful contact therewith.

In use, the upper clamp 40 and the lower clamp 70 are each fixed to the lamp post 30 by pressing the actuators 110 of each clamp together to open the jaws 100. Once engaged with the lamp post 30, each clamp 40,70 may be positioned vertically on the post 30 an appropriate distance from each other so as to best accommodate the musical instrument 20. The instrument base holder 90 is then secured to the clamp 70 by inserting the upper end 95 of each J-shaped rod 94 into one of the tubes 175 of the jaws 100. Likewise, each vertical post 62,69 of the instrument neck holder 60 is inserted into one of the tubes 175 of the jaws 100 of the upper clamp 40. The locking clips 180 are installed on the holders 60,90, preferably manually by clamping two conforming metal plates therearound and holding same together with a thumb-screw, or the like. The clamps 40,70 are aligned with each other rotationally on the post 30, and the musical instrument base 26 is engaged with the base holder 90. The neck 24 of the instrument 20 is then engaged with the C-shaped rod 65 of the neck holder 60.

While a particular form of the invention has been illustrated and described, it will be apparent that various modifications can be made without departing from the spirit and scope of the invention. For example, the specific type of holding means 60,90 may be adapted to the shapes of various types of musical instruments 20, not just guitars. Accordingly, it is not intended that the invention be limited, except as by the appended claims.

What is claimed is:

1. A system for holding a musical instrument to a vertical post, comprising:
- an upper clamp adapted for clamping to the vertical post and including an instrument neck holder for engaging an upper portion of the musical instrument;
- a lower clamp adapted for clamping to the vertical post and including an instrument base holder for engaging a lower portion of the musical instrument;
- wherein each clamp includes two arcuate jaws each terminating at one end at an actuator portion pivotally fixed to a pivot rod, a coil spring being included around the pivot rod to bias the jaws towards each other, such that when the actuators are squeezed towards each other the jaws are forced to pivot away from each other, the jaws adapted for clamping to the vertical post.

2. The system of claim 1 wherein another end of each jaw of each clamp terminates at holder attachment means.

3. The system of claim 2 wherein the instrument neck holder is a horizontal substantially C-shaped rod terminating at one end at a vertical post.

4. The system of claim 3 wherein the instrument neck holder further includes a substantially L-shaped rod having a horizontal post and a vertical post.

5. The system of claim 4 wherein each holder attachment means is a rigid cylindrical tube adapted for selectively receiving therein the vertical post of the L-shaped rod and the C-shaped rod, and further including a locking clip for selectively locking the L-shaped rod and the C-shaped rod together.

6. The system of claim 3 wherein the C-shaped rod further includes at least one padded stop for holding the upper portion of the instrument within a C-shaped portion of the C-shaped rod.

7. The system of claim 6 wherein the C-shaped rod further includes a spring-biased hinge at a central portion thereof for urging a second end of the C-shaped rod towards the vertical post thereof.

* * * * *